United States Patent
Frey et al.

(10) Patent No.: US 8,301,154 B2
(45) Date of Patent: Oct. 30, 2012

(54) METHOD FOR TRANSMITTING DATA IN A RADIO COMMUNICATION NETWORK

(75) Inventors: Andreas Frey, Wallenhorst (DE); Jürgen Mayer, Blaustein (DE); Olivia Nemethova, Bratislava (SK); Lars Wehmeier, Berlin (DE)

(73) Assignee: Nokia Siemens Network GmbH & Co. KG, Munich (DE)

( * ) Notice: Subject to any disclaimer, the term of this patent is extended or adjusted under 35 U.S.C. 154(b) by 351 days.

(21) Appl. No.: 10/552,149

(22) PCT Filed: Feb. 26, 2004

(86) PCT No.: PCT/EP2004/001935
§ 371 (c)(1),
(2), (4) Date: Jul. 17, 2006

(87) PCT Pub. No.: WO2004/091225
PCT Pub. Date: Oct. 21, 2004

(65) Prior Publication Data
US 2007/0019582 A1   Jan. 25, 2007

(30) Foreign Application Priority Data

Apr. 7, 2003 (DE) .................................. 103 15 767

(51) Int. Cl.
*H04W 72/00* (2009.01)
(52) U.S. Cl. .................... 455/452.2; 455/67.11; 455/69; 455/115.1; 455/450; 455/452.1; 370/252; 370/328; 370/329; 370/341
(58) Field of Classification Search ............... 455/452.2, 455/450, 452.1, 434, 63.1, 67.11, 67.13, 455/69, 115.1–115.4, 135, 161.3, 423, 425, 436–444, 522, 524, 525, 560, 561; 370/252, 370/310, 310.2, 318, 320, 331–333, 335, 370/342
See application file for complete search history.

(56) References Cited

U.S. PATENT DOCUMENTS 5,889,770 A * 3/1999 Jokiaho et al. ................ 370/337
(Continued)

FOREIGN PATENT DOCUMENTS

EP        1 069 790 A2      1/2001
(Continued)

OTHER PUBLICATIONS

European Search Reporting for International Application No. PCT/EP2004/001935; mailed Jan. 17, 2005.

*Primary Examiner* — Anthony Addy
(74) *Attorney, Agent, or Firm* — Staas & Halsey LLP

(57) ABSTRACT

In a radio communication system, a common channel is provided which is allocated to a plurality of subscribers at the same time for data transmission between a base station and a subscriber station. Measurements regarding the transmission quality are carried out on the common channel and their results are available in the base station. If the transmission quality does not meet a defined criterion, the base station transmits a first message to a controlling radio network controller associated therewith, the first message containing information about the transmission quality and about subscriber stations for which a bad transmission quality was measured. The controlling radio network controller sends a second message which informs serving radio network controllers, associated with the subscriber stations having bad transmission quality and responsible for the configuration of the subscriber stations, about the bad transmission quality.

17 Claims, 1 Drawing Sheet

U.S. PATENT DOCUMENTS

| | | | |
|---|---|---|---|
| 6,519,461 B1 | 2/2003 | Andersson et al. | |
| 6,574,475 B1* | 6/2003 | Suzuki | 455/438 |
| 6,597,894 B1* | 7/2003 | Ue et al. | 455/69 |
| 6,799,043 B2* | 9/2004 | Tiedemann et al. | 455/450 |
| 7,343,172 B2* | 3/2008 | Hwang | 455/522 |
| 7,397,790 B2* | 7/2008 | Zeira et al. | 370/352 |
| 7,742,781 B2* | 6/2010 | Chen et al. | 455/522 |
| 8,045,987 B2* | 10/2011 | Rudolf et al. | 455/436 |
| 2002/0160781 A1* | 10/2002 | Bark et al. | 455/450 |
| 2003/0016641 A1* | 1/2003 | Terry et al. | 370/335 |
| 2003/0031119 A1* | 2/2003 | Kim et al. | 370/200 |
| 2003/0119452 A1* | 6/2003 | Kim et al. | 455/69 |
| 2003/0161343 A1* | 8/2003 | Ghosh | 370/465 |
| 2004/0022213 A1* | 2/2004 | Choi et al. | 370/332 |
| 2004/0233895 A1* | 11/2004 | Linares | 370/352 |
| 2005/0239460 A1* | 10/2005 | Kroth et al. | 455/434 |
| 2009/0093243 A1* | 4/2009 | Lee et al. | 455/418 |

FOREIGN PATENT DOCUMENTS

| | | |
|---|---|---|
| EP | 1069790 A2 * | 1/2001 |
| WO | 02/01897 A1 | 1/2002 |
| WO | WO 02/01897 A1 | 1/2002 |
| WO | 03/088702 A1 | 10/2003 |
| WO | WO 03/088702 A1 | 10/2003 |

* cited by examiner

METHOD FOR TRANSMITTING DATA IN A RADIO COMMUNICATION NETWORK

CROSS REFERENCE TO RELATED APPLICATIONS

This application is based on and hereby claims priority to German Application No. 10315767.0 filed on Apr. 7, 2003, the contents of which are hereby incorporated by reference.

BACKGROUND OF THE INVENTION

In radio communication systems, information, e.g. voice, picture information or data is transmitted with the aid of electromagnetic waves via a radio interface between a base station and a subscriber station, e.g. a mobile station. The radiation of the electromagnetic waves in this case is by carrier frequencies that lie within a frequency band provided for the particular system. For future mobile radio systems, the radio interface will be subdivided, according to the TD/CDMA access method or FD/CDMA access method, into transmission channels that separate the radio resources of the radio interface for the individual subscriber stations. For UMTS (Universal Mobile Telecommunication Systems) or other third-generation systems, frequencies, for example in the approximately 2000 MHz frequency band, are provided for the transmission channels.

In the UMTS system, a connection is established between a base station, also designated as node B, and a subscriber station. The base station is assigned a controlling radio network controller that manages the radio resources of the base station and through which a connection to a core network is established. Professionally, the controlling radio controller is frequently known as a controlling radio network controller or CRNC. The subscriber station is assigned a serving radio network controller in the UMTS system, often known as a serving radio network controller or SRNC. This serving radio network controller is usually the radio network controller through which the connection to the subscriber station was initially established and it remains assigned to the subscriber station even if the subscriber station moves to the area of a different radio network controller. The serving radio network controller is responsible for the configuration of the subscriber station. To do this, the subscriber station transmits dedicated measuring protocols to the serving radio network controller for the duration of the connection. These measuring protocols are transmitted transparently for the controlling radio network and the base station.

In the UMTS and other third-generation systems, a common channel is provided, known as a shared channel, to which several subscribers can be assigned at the same time for data transmission between a base station and a subscriber station. The requirements of the individual subscribers in this case are managed in a queue in the base station. The assignment of resources for the common channel, however, takes place in the controlling radio network controller that is assigned to the base station.

In many mobile radio systems, particularly those of the third-generation of mobile radios, various services are offered for data transmission, to which different service quality parameters, also known as quality of services, are assigned. These can for example be agreed transmission rates or agreed delay times. Services to which the same quality of services parameters are assigned are allocated to a quality of service class.

If the common channel becomes overloaded, the quality of service parameters for the individual services can therefore no longer be maintained. It has therefore been proposed that the base station informs the controlling radio network controller when it is determined that individual quality of service classes can no longer achieve the required and agreed quality of service parameters. This notification takes place in something called a common measurement. In this case, the controlling radio network controller of the base station allocates additional resources for the common channel. This does not take account of how the radio conditions for individual subscriber stations appear. Situations are conceivable whereby the quality of service requirements can only be inadequately fulfilled by resource allocation because the radio conditions for individual subscriber stations are very bad.

SUMMARY OF THE INVENTION

An object of the invention is therefore to provide a method for the transmission of data in a radio communication system whereby the allocation of radio resources on a common channel is improved.

In the method for the transmission of data in a radio communication system, a common channel is provided that is allocated to a plurality of subscribers at the same time for data transmission between a base station and a subscriber station of the particular subscriber. The quality of transmission on the common channel is measured and the results are available in the base station. If the measurements show that the quality of transmission does not meet a specified criterion, the base station transmits a first message to a controlling radio network controller assigned to it. This first message contains, in addition to information on the transmission quality, information on the subscriber stations for which a bad quality of transmission was measured.

Based on the first message, the controlling radio network controller can determine the measures to be taken to improve the quality of transmission. If the analysis shows that the quality of transmission for all the subscriber stations is essentially the same, the invention provides for the allocation of further resources to the common channel by the controlling radio network controller.

If, however, the analysis shows that the quality of transmission for the subscriber stations varies and is bad only for individual subscriber stations, then, in accordance with the invention, the controlling radio network controller by a second message informs the serving radio network controllers that are assigned to the subscriber stations with a bad quality of transmission and are responsible for the configuration of the particular terminal of the bad quality of transmission. Because, due to the first message, information is available to the controlling radio network controller regarding the subscriber stations for which the bad quality of transmission was measured, the controlling radio network controller is able to directly inform the serving radio network controllers assigned to these subscriber stations, by the second message. The serving radio network controllers then have the ability to change the configuration of the relevant subscriber station so that the problem of the quality of transmission is solved. The second messages for different subscriber stations can vary.

An advantage of the method is that the controlling radio network controller is precisely informed, by the first message, of the subscriber stations for which a bad quality of transmission and thus perhaps also, non-compliance with the quality of service parameters, was determined. The interfaces between the base station and controlling radio network controller, or between the controlling radio network controller and serving radio network controller, are loaded only to an acceptable amount by the transmission of the first message and the second message, because no superfluous information is transmitted. A further advantage is that the first message can be transmitted with the common measurement, that is required in any case.

The invention provides for further measurements to be performed in the base station. Alternatively, the measurements can also be performed in the subscriber stations. In this case, the results of the measurements are transmitted to the base station.

In cases where a specified transmission rate has been agreed for each subscriber, compliance with the agreed transmission rate is checked when measuring the quality of transmission.

In cases where a timer is allocated to the data units to be transmitted and the data units are not transmitted after the set time has elapsed, a check is carried out during the measurement of the quality of transmission to determine whether the number of elapsed timers exceeds a predetermined threshold value relative to the total of the allocated timers. In this way, compliance with the agreed delay times is measured.

Preferably the first message contains the names of the subscriber stations for which the bad quality of transmission was measured. Additionally, the first message can contain the number of subscriber stations for which a bad quality of transmission was measured.

In various radio communication systems, the subscriber stations are assigned a temporary identification by the controlling radio network controller. In the UTMS system, the identification is called a C-RNTI or Cell Radio Network Temporary Identity. Preferably, the temporary identification is used to name the subscriber stations in the first message or second message.

Preferably, the controlling radio network controller derives, from the first message, a suggested solution for changing the configuration of the subscriber stations and transmits this suggested solution with the second message to the serving radio network controllers. This means that the controlling radio network controller undertakes the management of the technical radio resources for the base station. Therefore, it is possible for the controlling radio network controller to determine an optimum configuration for the individual subscribers, taking account of all the subscribers supplied by the base stations.

If, for example, the controlling radio network controller determines that an improvement in the overall situation for the common channel is possible by transferring the connection to a different base station or by assigning a dedicated channel, then, in accordance with the invention, the proposed solution can contain instructions for a possible transfer procedure to a different base station or for the assignment of a dedicated channel for the subscriber station under consideration.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
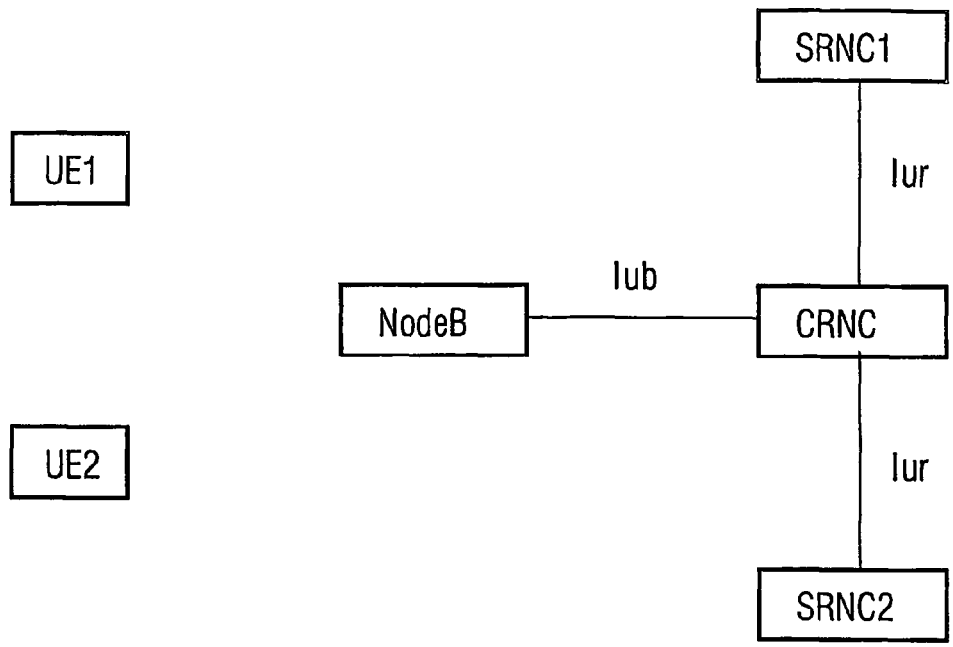
FIG. 1 is a block diagram of a radio communication system.

Reference will now be made in detail to the preferred embodiments of the present invention, examples of which are illustrated in the accompanying drawings, wherein like reference numerals refer to like elements throughout.

A first subscriber station UE1 and a second subscriber station UE2 each have a connection established to a base station node B (see FIG. 1). The base station node B is controlled via an Iub interface from a controlling radio network controller CRNC. The controlling radio network controller CRNC in each case is connected via an Iur interface to a first serving radio network controller SRNC1 and a second serving radio network controller SRNC2. The first serving radio network controller SRNC1 is responsible for the configuration of the first subscriber station UE1. The second serving radio network controller SRNC2 is responsible for the configuration of the second subscriber station UE2.

A High Speed Data Packet Access (HSDPA) is set up in the base station node B. A common channel is assigned to the High Speed Data Packet Access. The common channel is at the same time assigned to the first subscriber station UE1 and the second subscriber station UE2, that participate in the High Speed Data Packet Access. A queue is established in the base station node B, that controls the timing of the assignment of data for the first subscriber station UE1 and the second subscriber station UE2 to the common channel.

The achieved rate of transmission and the actual delay time during data transmission for the first subscriber station UE1 and the second subscriber station UE2 is measured in the base station node B. If the base station node B determines that the agreed data rate and/or delay time is not achieved for one or both of the subscriber stations UE1,2, the base station node B transmits a first message via the Iub interface to the controlling radio network controller CRNC. Alternatively, the measurements can be carried out in the subscriber stations UE1, UE2, whereby the results of the measurements are then transmitted from the particular subscriber station to the base station.

The first message contains information as to whether or not the transmission quality for at least one of the subscriber stations UE1, UE2 meets the requirements and it also carries information regarding the identity of the subscriber station UE1,UE2 for which the bad quality of transmission was determined. The subscriber stations UE1, UE2 are, for example, identified by a temporary identification provided by the controlling radio network controller CRNC and for which the designation Cell Radio Network Temporary Identity or C-RNTI is used.

The distribution of the radio resources of base station node B is analyzed in the controlling radio network controller CRNC to determine how the configuration of the subscriber stations UE1, UE2 can be changed in order to achieve an adequate quality of transmission. The controlling radio network controller CRNC can assign additional resources to the common channel, depending on the results of the analysis. If the analysis shows that the quality of transmission for individual subscriber stations UE1, UE2 is bad and that this can be changed by changing the configuration, then, in the controlling radio network controller CRNC, a second message is generated for the first subscriber station UE1, that is transmitted to the first serving radio network controller SRNC1, or a second message is generated for the second subscriber station UE2 and this is transmitted to the second serving radio network controller SRNC2. The second message tells the serving radio network controller SRNC1 or SRNC2 that an adequate quality of transmission is not being achieved for the first or second subscriber station UE1, UE2. Furthermore, the second message contains a suggestion from the controlling radio network controller CRNC as to how the configuration of the first subscriber station UE1 or second subscriber station UE2 can be changed in order to achieve a satisfactory quality of transmission. Activated by the second message, procedures are initiated in the first serving radio network controller SRNC1 and the second serving radio network controller SRNC2, by which the first subscriber station UE1 and/or the second subscriber station UE2 is reconfigured.

The second message generated for the first subscriber station UE1 and transmitted to the first serving radio network controller SRNC1 can differ from the second message generated for the second subscriber station UE2 and transmitted to the second serving radio station SRNC2.

If, for example, only the first subscriber station UE1 is determined to have a bad quality of transmission, a second message is generated and transmitted only for the first serving radio station SRNC1.

Figure 2:
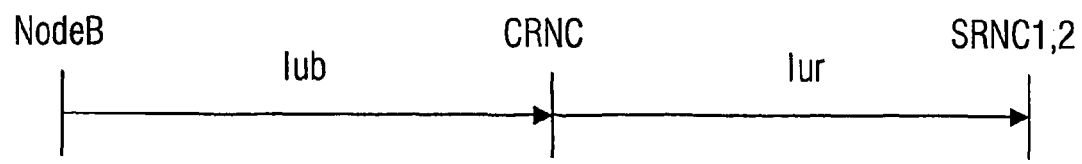
FIG. 2 is a data transmission diagram showing message flow in accordance with the invention.

The first message is transmitted, for example as a common measurement report, between the base station node B and the controlling radio network controller CRNC via the Iub interface (see FIG. 2). A message with the designation common measurement report is provided in the existing UMTS system, in order to inform the controlling radio network controller CRNC that the quality of service parameters are not met for certain quality of service classes. In accordance with the invention, it is proposed to expand this common measurement report in the sense of the first message so that it contains information for identification of the subscriber station for which the transmission quality is not adequate.

On the basis of the first message, a second message is generated in the controlling radio network controller CRNC, that for example can be called the deviation indication, and is transmitted via the Iur interface to the serving first radio network controller and to the serving second radio network controller. A second message of this kind has not previously been provided in the UMTS system.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for transmitting data in a radio communications system, comprising:
   providing a common channel allocated concurrently to a plurality of subscribers for data transmission between a base station and subscriber stations of the subscribers;
   taking measurements in the subscriber stations of transmission quality of the common channel for each of the subscriber stations;
   transmitting the measurements to the base station so as to make the measurements available to the base station; and
   transmitting from the base station a first message to a controlling radio network controller allocated to the base station when the measurements show that the transmission quality does not meet a first defined criterion, the first message containing information about the transmission quality and an identifier of at least one particular subscriber station for which the measurements indicated that the transmission quality meets a second criterion,
   wherein the measurements of transmission quality are based on at least one of a transmission rate via the common channel and determining a ratio of a number of elapsed timers relative to a total number of allocated timers.

2. A method in accordance with claim 1,
   wherein each of the subscriber stations has a serving radio network controller corresponding thereto which is responsible for configuration of the respective subscriber stations, and
   wherein said method further comprises transmitting a second message from the controlling radio network controller to the serving radio network controller allocated to each of the at least one particular subscriber station.

3. A method in accordance with claim 2,
   wherein a specified transmission rate is agreed for each subscriber, and
   wherein said method further comprises checking compliance with the agreed transmission rate during said making of the measurements of the transmission quality.

4. A method in accordance with claim 3, further comprising:
   allocating timers to data units to be transmitted;
   ceasing transmission of the data units after a corresponding timer has elapsed; and
   checking, during the making of the measurements of the transmission quality, to determine whether a number of elapsed timers relative to a total number of allocated timers exceeds a specified threshold value.

5. A method in accordance with claim 4, wherein the first message contains at least one of a name of each of the at least one particular subscriber station and how many of the subscriber stations for which the transmission quality was bad.

6. A method in accordance with claim 5, wherein the second message contains the name of each of the at least one particular subscriber station.

7. A method in accordance with claim 6,
   further comprising allocating a temporary identification being to the subscriber stations by the controlling radio network controller, and
   wherein the temporary identification is used to name the subscriber stations.

8. A method in accordance with claim 7,
   further comprising deriving, by the controlling radio network controller, a suggested solution for a change of the configuration of the subscriber stations from the first message, and
   wherein the second message includes the suggested solution.

9. A method in accordance with claim 8, wherein the suggested solution contains information on at least one of a possible transmission procedure to a different base station and allocation of a dedicated channel for a corresponding one of the at least one particular subscriber station.

10. A method in accordance with claim 2,
    further comprising deriving, by the controlling radio network controller, a suggested solution for a change of the configuration of the subscriber stations from the first message, and
    wherein the second message includes the suggested solution.

11. A method in accordance with claim 1,
    wherein each of the subscriber stations has a serving radio network controller corresponding thereto which is responsible for configuration of the respective subscriber stations, and
    wherein said method further comprises transmitting a second message from the controlling radio network controller to the serving radio network controller allocated to each of the at least one particular subscriber station.

12. A method in accordance with claim 11,
further comprising deriving, by the controlling radio network controller, a suggested solution for a change of the configuration of the subscriber stations from the first message, and
wherein the second message includes the suggested solution.

13. A method in accordance with claim 1,
wherein each of the subscriber stations has a serving radio network controller corresponding thereto which is responsible for configuration of the respective subscriber stations, and
wherein said method further comprises transmitting a second message from the controlling radio network controller to the serving radio network controller allocated to each of the at least one particular subscriber station.

14. A method in accordance with claim 13,
further comprising deriving, by the controlling radio network controller, a suggested solution for a change of the configuration of the subscriber stations from the first message, and
wherein the second message includes the suggested solution.

15. A radio communications system, comprising:
serving radio network controllers;
a controlling radio network controller in communication with the serving radio network controllers;
base stations in communication with the controlling radio controller;
a plurality of subscriber stations using a shared channel for exchanging data with a base station among the base stations, each subscriber station being configurable based on a message received from one of serving radio network controllers,
wherein a base station sends a first message to the controlling radio network controller when a transmission quality measured in the subscriber stations and made available to the base station of at least one of the plurality of subscriber stations exchanging data with the base station does not meet a defined criterion, the first message containing information about the transmission quality and about the at least one subscriber station, and
wherein the measurements of transmission quality are based on at least one of a transmission rate via the shared channel and determining a ratio of a number of elapsed timers relative to a total number of allocated timers.

16. A radio communications system in accordance with claim 15, wherein the controlling radio network controller sends a second message to the one of the serving radio controllers that is able to configure the at least one subscriber stations.

17. A method for transmitting data in a radio communications system in which a plurality of subscriber stations use a shared channel for exchanging data with a base station, comprising:
measuring a transmission quality of the shared channel for each of the subscriber stations in the subscriber stations;
transmitting the measured transmission quality to the base station; and
transmitting a first message from the base station to a controlling radio network controller controlling the base station when transmission quality based on one of a transmission rate and a ratio of a number of elapsed timers relative to a total number of allocated timers of at least one of the subscriber stations is inadequate, the first message containing information about the measured transmission quality of the at least one subscriber station with inadequate transmission quality.

* * * * *